(12) United States Patent
Doss et al.

(10) Patent No.: US 6,848,838 B2
(45) Date of Patent: Feb. 1, 2005

(54) OPTICAL FIBER PLUG

(75) Inventors: Donald G. Doss, Round Rock, TX (US); David S. Hardcastle, Liberty Hill, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/247,143

(22) Filed: Sep. 19, 2002

(65) Prior Publication Data

US 2004/0057676 A1 Mar. 25, 2004

(51) Int. Cl.$^7$ ................................................ G02B 6/36
(52) U.S. Cl. ............................................................ 385/81
(58) Field of Search .............................. 385/81, 72, 73, 385/55, 56, 65, 70, 75, 58, 62, 64, 77, 78, 82, 139, 83, 97–99, 87

(56) References Cited

U.S. PATENT DOCUMENTS

| | | | |
|---|---|---|---|
| 4,418,983 A | * 12/1983 | Bowen et al. | 385/69 |
| 4,511,620 A | 4/1985 | Kroupa et al. | |
| 4,986,626 A | * 1/1991 | Bossard | 385/76 |
| 5,381,498 A | 1/1995 | Bylander | |
| 5,466,532 A | 11/1995 | Wengrovius et al. | |
| 5,619,604 A | * 4/1997 | Shiflett et al. | 385/59 |
| 5,638,477 A | 6/1997 | Patterson et al. | |
| 5,682,450 A | * 10/1997 | Patterson et al. | 385/65 |
| 5,732,174 A | * 3/1998 | Carpenter et al. | 385/72 |
| 5,734,770 A | * 3/1998 | Carpenter et al. | 385/72 |
| 5,741,552 A | 4/1998 | Takayama et al. | |
| 5,757,997 A | 5/1998 | Birrell et al. | |
| 5,813,902 A | 9/1998 | Wiegand | |
| 5,857,045 A | 1/1999 | Lee | |
| 6,026,210 A | 2/2000 | Berglund et al. | |
| 6,078,719 A | 6/2000 | Wiegand et al. | |
| 6,099,392 A | 8/2000 | Wiegand et al. | |

FOREIGN PATENT DOCUMENTS

| | | |
|---|---|---|
| EP | 0 116 481 A1 | 8/1984 |
| EP | 0 702 254 A2 | 3/1996 |
| EP | 1 054 278 A2 * | 11/2000 |
| EP | 1 116 974 A2 * | 7/2001 |
| EP | 1 162 486 A2 | 12/2001 |

OTHER PUBLICATIONS

Mayer, et al., "Photohydrosilylation Reaction of Silicone Polymers. Platinum–Based Photocatalysts: Timethyl(β–dicarbonyl) Platinum (IV) Complexes", Journal of Polymer Science: Part A; Polymer Chemistry, vol. 34, 1996, pp. 3141–3146.

* cited by examiner

Primary Examiner—Jean F. Duverne
(74) Attorney, Agent, or Firm—Gregg H. Rosenblatt

(57) ABSTRACT

An optical fiber connector plug for an optical fiber connection comprises a connecting portion including a rear entry at a first end and a first fiber stub exit opening to a first fiber stub channel. The first fiber stub exit is parallel to a second fiber stub exit opening to a second fiber stub channel. The first and second fiber stub exits are formed opposite the first end. The rear entry divides at a junction into a first fiber groove and a second, diverging fiber groove. The connecting portion includes crimp elements each having an open-ended bore. Each crimp element contains an optical fiber stub. A molded top attached to the connecting portion includes a substantially rectangular opening. The opening contains a compression element that moves to form splices by capturing a stripped optical fiber and an optical fiber stub in each of the crimp elements. A bend relief boot encloses the connecting portion at one end, while a shroud releasably engages it at the other end.

8 Claims, 9 Drawing Sheets

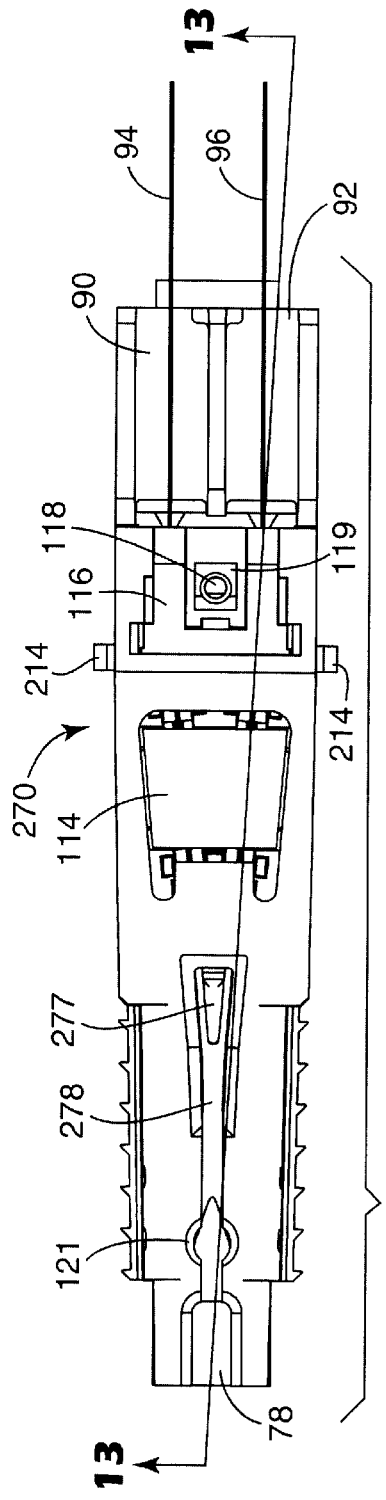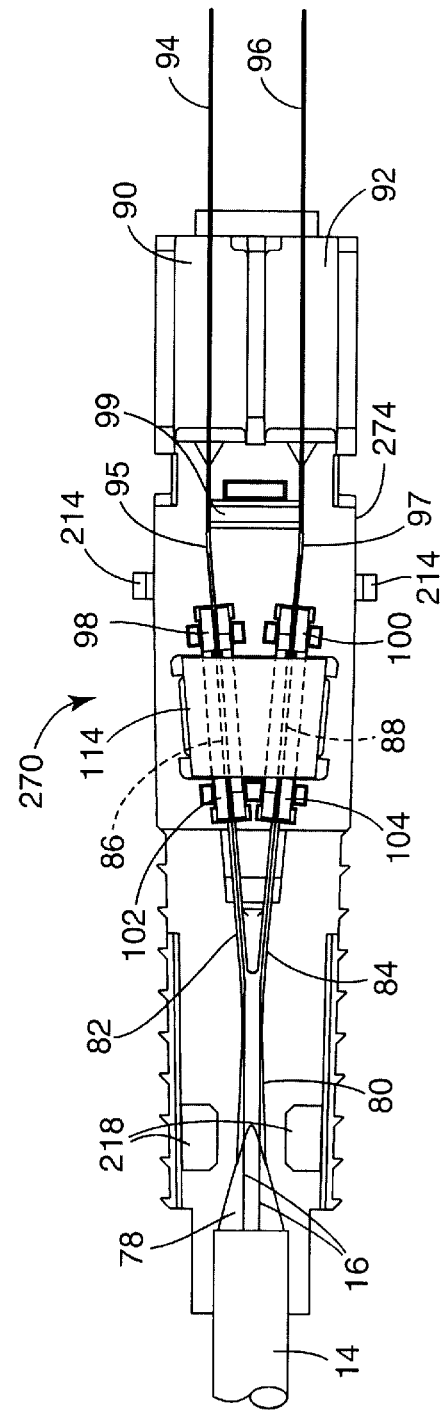

OPTICAL FIBER PLUG

BACKGROUND OF THE INVENTION

1. Field of the Invention

The invention relates to devices for preparing and terminating optical fibers for interconnection in telecommunications networks using plug and socket assemblies that align the optical fibers for optimal signal transmission without the use of ferrules. More particularly, the present invention facilitates field processing of one or more cleaved and polished bare fiber ends using an apparatus for temporary containment during suitable preparation of terminal portions of optical fiber cables for field installation into the plug portion of an optical fiber plug and receptacle connector.

2. Description of the Related Art

The use of optical fibers in telecommunications networks offers the advantage of broader bandwidth when compared to the copper wire systems that have dominated this industry. Today's high speed, bandwidth-intensive computing environments provide justification for increased use of optical fiber cables. The demand for optical fiber is expected to increase as transmission protocols reach higher and higher speeds and bandwidth requirements continue to grow. Until recently, cost was a deterrent to the use of optical fiber systems. The impact of cost has become less severe because of improvement in the supporting electronics and optical communications infrastructure. In addition, an increase in the volume of optical fiber production has driven down the cost of optical fiber components and devices. Optical fiber systems will become the preferred choice as component and installation costs approach parity with copper wire systems.

As with copper wire, it is necessary to provide means for interconnection and termination of optical fibers. Interconnection of optical fibers may be achieved by a number of methods including the methods of splicing and connecting. A splice is generally understood to be the formation of a permanent connection between a pair of optical fibers. The act of connecting optical fibers requires a device, i.e. a connector that facilitates repeated engagement and disengagement of optical fibers. An optical fiber connector, for one or more optical fibers, typically includes a plug portion and a receptacle or socket portion. Insertion of the plug portion into the receptacle portion provides interconnection for optical signal transmission between optical fibers,. During the mating of a plug portion with a receptacle portion of an optical fiber connector, there is the need to provide accurate axial alignment of lengths of optical fiber for the number of optical fibers contained within each plug or receptacle. One requirement of an optical fiber connector is the joining together of lengths of optical fibers so aligned that light energy will propagate from one fiber to the other without insertion loss that may be observed as an appreciable light attenuation. To reduce insertion loss at the point of optical fiber connection, it is necessary to have precise registration and abutting fiber contact across the entire end of each optical fiber end face.

A broad range of devices exist for connecting and aligning optical fibers, whether the connection includes only a pair of optical fibers, i.e. one optical fiber in both the plug and receptacle portion of the optical fiber connector, or two or more fiber pairs. The majority of connectors include ferrules that rely on alignment of the outer surface of each ferrule to provide fiber alignment during termination, polishing and a positioning of each optical fiber end in an optical fiber connector.

A relatively recent development in optical fiber interconnection devices eliminates the need for ferrule-terminated optical fibers. These alternate plug and socket connectors use fiber guiding V-grooves to align cleaved and polished end portions of stripped optical fibers for optimum signal transmission. Connector assemblies using V-grooves for optical fiber alignment are adaptable to the needs of simplex (one fiber), duplex (two fibers), and multiplex (two or more fibers) connectors. They also offer advantages over ferrule-terminated optical fibers such as fewer component parts, smaller size and convenient assembly.

Further discussion emphasizes connector assemblies using V-groove alignment of optical fibers that undergo repeated engagement and disengagement. U.S. Pat. No. 5,381,498 describes a modular, multi-fiber connector comprising a plug and receptacle having an appearance similar to a conventional RJ 45 jack for copper conductors. The plug includes a body having a surface with several grooves that position and limit movement of otherwise free end portions of optical fibers. Fibers inside the receptacle are free to move into the grooves inside the plug body and into forcible abutment with the terminal ends of the plug fibers during insertion of the plug through an opening in the body of the receptacle. U.S. Pat. Nos. 5,757,997 and 6,026,210 and related patents, for example, describe subsequent development of connectors using V-groove alignment of optical fibers. These later versions of optical fiber connectors include features such as internal fiber splices using crimp elements, similar to those described in U.S. Pat. No. 5,638,477, and optical fiber holders of the type described in U.S. Pat. No. 6,078,719. Optical fiber holders become permanently applied around one or more optical fibers during fiber preparation using a device that cleaves stripped terminal portions of one or more optical fibers to a length determined by the dimensions of the optical fiber receptacle. The cleaving process has the capability for precise cleaving and polishing to produce multiple optical fibers having substantially the same length. U.S. Pat. Nos. 5,813,902, and 6,099,392 further describe systems and processes for cleaving and polishing terminal portions of optical fibers prior to assembly of connector receptacles or sockets in the field.

Implementation of optical fiber cable networks using cable interconnection based upon V-groove connectors requires field termination for either a connector receptacle or a connector plug or both. Field installation of optical fiber cables employs known methods for applying a receptacle or socket to a stripped end portion of one or more optical fibers. The lack of a corresponding method for field installation of connector plugs limits field-termination capability to optical fiber cables having a connector receptacle at each end. This limitation restricts optical fiber cable interconnection to a single option in which field-terminated cables, having connector receptacles at both ends, alternate with factory terminated cables, having connector plugs on both ends. Factory production of connector plug terminated optical fiber cables typically provides a limited variety of standard cable lengths. The use of pre-terminated standard lengths of optical fiber cable prevents the use of normal methods for installing optical fiber cable by pulling it through cable ducts or the like before applying connector plugs and sockets for interconnecting lengths of cable. Pre-terminated, factory assembled, optical fiber cables add expense and require more cable duct space than conventional cable systems. Reliance on standard lengths of terminated cables also denies the advantage of efficient use of space associated with custom installations. To provide more options and to facilitate installation of custom cable networks, there is a need for field installable optical fiber connector plugs so that cable network installers may choose whether to terminate a particular cable with either a connector plug or a connector socket.

SUMMARY OF THE INVENTION

The present invention provides an apparatus used during cleaving and polishing of optical fibers to be inserted into a connector plug body that accommodates one or more optical fibers. Connector plugs according to the present invention include several different embodiments having design features that facilitate preparation and insertion and splicing of optical fibers by a person who is relatively unskilled as an assembler of optical fiber connector components. Optical fiber insertion may be done by hand as a field operation requiring only the use of a crimp tool, for crimp element closure, to secure and retain one or more spliced optical fibers inside a connector plug.

Field installation of optical fiber connector plugs, in conjunction with the previously discussed field installable receptacles, offers several benefits including convenience, development of custom network segments, and the opportunity to order bulk supplies, rather than an array of standard components. These benefits could contribute to a reduction of optical fiber cable network installation costs.

The use of connector plugs and processes according to the present invention with previously available field installable sockets is convenient because it moves optical fiber termination from the controlled assembly environment of the factory to the field location where actual installation requirements are more clearly seen. Given the opportunity to construct cable systems to match the needs of a particular installation, an assembler is no longer limited to using factory terminated, standard cable lengths but has the advantage of custom building interconnecting cables. Custom interconnecting cables may be prepared using bulk optical fiber cable and connector components that may prove to be a less expensive option than reliance on supplier-determined, standard lengths of plug terminated cables. Field termination of connector plugs allows cable installers to return to more conventional methods of network installation.

The present invention includes an article used in the process of cleaving and polishing the ends of optical fibers before termination inside a connector plug or socket of an optical fiber connector assembly. An optical fiber connector assembly includes a connector plug and socket having V-grooves, rather than ferrules, for aligning cleaved and polished ends of terminal portions of optical signal-carrying optical fibers.

Articles for preparing optical fibers for termination are referred to herein as "pucks" for cleaving and polishing optical fiber ends. Initial preparation of a cable, containing one or more individual optical fibers, requires that the sheath and buffer layers be stripped from a generous terminal portion of each optical fiber.

A puck, as described herein, has a design with enough room to accommodate a single optical fiber or multiple fibers simultaneously during the process of optical fiber cleaving and polishing. Simultaneous processing of multiple fibers produces cleaved and polished optical fiber ends on stripped terminal fiber portions of equal and precisely controlled length. The length requirements match those needed for optimum fiber positioning after insertion into the body of any of the embodiments of optical fiber connector plugs according to the present invention.

The process of cleaving and polishing the ends of optical fibers includes temporary insertion of stripped optical fiber terminal portions into a fiber holder that includes a spring clamp. Preparation for cleaving of optical fiber ends requires placement of the fiber holder in a recess in the puck so that short lengths of one or more optical fibers extend from the holder to pass through openings in a guide plate opposite a holder entry port that receives a portion of un-stripped optical fiber cable. Correct positioning of the holder in the recess places the jacketed cable, exiting the holder entry port, in a groove in the puck. A hinged lid, attached to the puck, closes over the holder and the jacketed optical fiber cable to grip the cable and actuate the spring clamp in the holder. A latching mechanism secures the hinged lid to the body of the puck preventing movement of either the un-stripped, jacketed cable or the stripped optical fiber terminal portions during cleaving of optical fiber ends. After loading and securing the holder and the optical fiber cable in the puck, cleaving of immobilized optical fibers produces optical fiber terminal portions of precise and equal length based upon the design and dimensions of the puck. The guide plate has a shape for mating in a required, fixed orientation with a groove in a cleaving and polishing device. After correct positioning of the puck, using the guide plate, stripped optical fibers, extending from the guide plate, are essentially perpendicular to a cleaving blade of the cleaving and polishing device. Smooth movement of the puck past the cleaving blade produces one or more cleaved optical fibers that optionally have slightly angled end faces at an angle of 10° or less. Slightly angled and polished optical fiber end faces have been shown to provide optical splices that transmit optical signals with less signal attenuation than optical splices in which the polished end faces are substantially perpendicular to the longitudinal axis of the optical fiber.

The puck may be removed from the cleaving section of the cleaving and polishing device and, while still in the puck, and with the lid in its latched position, the cleaved optical fiber ends may be polished against a polishing strip using several repetitions of a rubbing motion. Cleaning of the fiber ends, after polishing, may be required, using conventional cleaning materials and methods, including liquid spray cleaning, to remove accumulated debris that could obscure the fiber end face causing optical signal attenuation. Thereafter, pivoting the guide plate, unlatching the hinged lid, lifting the jacketed cable and fiber holder, and separating the two main parts of the temporary holder releases the stripped, cleaved and polished optical fibers from the puck.

Field assembly of a connector plug involves the relatively simple process of inserting one or more optical fibers into one side of crimp elements. The crimp elements have limited movement in elongate depressions formed in the floor of the molded base of any one of several embodiments of connector plugs according to the present invention. Connector plugs may be used with single optical fibers, but preferably the plug has a design to accommodate two or more optical fibers. Most preferably the plug may be used as a duplex plug, for two optical fibers contained in a single-jacketed cable. Each optical fiber enters its assigned crimp element to the point at which it contacts the cleaved and polished face of an optical fiber stub that was factory installed at the opposite end of the crimp element. A crimp element has a size and internal design to provide accurate alignment, orientation and facial contact between each newly cleaved optical fiber end and each optical fiber stub. Interfacial contact for optimum signal transmission through multi-fiber connector plugs relies upon the equal length of the optical fiber terminal portions, having slightly angled, cleaved and polished end faces, and the precise positioning of the crimp elements within the connector plug. After achieving the desired positioning and alignment, the newly cleaved fiber ends may be secured in the crimp elements using a crimping tool, also referred to herein as a compression cap.

Optical signal transmission relies upon accurate alignment full surface contact of the slightly angled ends of optical fibers and optical fiber stubs spliced together using crimp elements as described previously. Other features of connector plugs according to the present invention facilitate insertion of one or more optical fibers into the body of a connector plug and allow component size reduction, which results in optical fiber cable installations requiring less space or containing increased numbers of plug and socket connections.

More particularly the present invention provides an article for temporarily retaining an optical fiber cable including a stripped terminal portion of at least one optical fiber requiring cleaving followed by polishing of an end face thereof. The article comprises a housing having a recess for a demountable optical fiber holder. A demountable optical fiber holder includes a base-plate having at least a first fiber channel formed therein to receive the stripped portion of the at least one optical fiber. The base plate has a number of pockets. A cover plate for the demountable optical fiber holder includes a spring clamp, at least a first upper channel and a number of posts to mate with the pockets of the base-plate to assemble the demountable optical fiber holder. The article further includes a guide plate attached at the distal end of the housing to pivot between a first pivot position and a second pivot position. The guide plate has at least one opening for the stripped portion of the at least one optical fiber. A rotatable lid attached to the housing rotates between an open position and a closed position. The lid includes a latch and a pressure bar, with the latch engaging the housing to bias the pressure bar against the spring clamp to hold the optical fiber immobile between the spring clamp and at least the first fiber channel when the demountable holder resides in the recess. The article temporarily retains the optical fiber cable for cleaving and polishing the end face thereof when the lid is closed.

The present invention also provides an optical fiber connector plug for mating with an optical fiber receptacle to form an optical fiber connection. The optical fiber connector plug comprises a connecting portion comprising a containment body including a rear entry at a first end and a first fiber stub exit opening to a first fiber stub channel. The first fiber stub exit is parallel to a second fiber stub exit opening to a second fiber stub channel. The first and second fiber stub exits are formed at a second end opposite the first end of the containment body. The rear entry divides at a junction into a first fiber groove and a second fiber groove that diverges from the first fiber groove. The containment body includes first and second crimp elements each having an open-ended bore coaxial with the first and second fiber grooves. Each crimp element contains a optical fiber stub. A molded top attached to the containment body includes a substantially rectangular opening. The opening contains a compression element that moves between a first position and a second position to apply force to the first crimp element and the second crimp element. In its first and second positions the compression element first adjusts each bore and then forms splices by capturing a stripped, cleaved and polished end portion of an optical fiber and an optical fiber stub in each of the crimp elements. A bend relief boot encloses the connecting portion at one end, while a shroud releasably engages it at the other end.

The present invention further provides an optical fiber connector plug for mating with an optical fiber receptacle to form an optical fiber connection. The optical fiber connector plug comprises a connecting portion comprising a containment body including a rear entry at a first end and a first fiber stub exit opening to a first fiber stub channel. The first fiber stub exit is parallel to a second fiber stub exit opening to a second fiber stub channel. The first and second fiber stub exits are formed at a second end opposite the first end of the containment body. An optical fiber connector plug according to the present invention includes a holder for permanent retention of at least one stripped, cleaved and polished end portion of a an optical fiber. The holder has a size for insertion into the rear entry of the containment body. The containment body includes first and second crimp elements each having an open-ended bore coaxial with the fiber stub channels. Each crimp element contains a optical fiber stub. A molded top attached to the containment body includes a substantially rectangular opening. The opening contains a compression element that moves between a first position and a second position to apply force to the first crimp element and the second crimp element. In its first and second positions the compression element first adjusts each bore and then forms splices by capturing a stripped, cleaved and polished end portion of an optical fiber and an optical fiber stub in each of the crimp elements. A bend relief boot encloses the connecting portion at one end, while a shroud releasably engages it at the other end.

According to the present invention a process may be used for field terminating at least one optical fiber in an optical fiber connector plug. The process comprises a number of steps including providing an article for retaining an optical fiber cable. The article comprises a housing having a recess for an optical fiber holder. The article further includes a guide plate attached at the end of the housing to pivot between a first pivot position and a second pivot position. The guide plate has at least one opening for a stripped portion of at least one optical fiber. A rotatable lid attached to the housing rotates between an open position and a closed position. The article temporarily retains the optical fiber cable for cleaving and polishing the end face of the optical fiber when the lid is closed. The guide plate engages a cleaving device for cleaving at least one optical fiber. This is followed by polishing the end face of the at least one cleaved fiber end to provide a stripped, cleaved and polished end portion of at least one optical fiber. Removal of the optical fiber cable and the demountable optical fiber holder from the article precedes release of the stripped, cleaved and polished end portion of the at least one optical fiber from the optical fiber holder. The optical cable is then terminated by inserting the stripped, cleaved and polished end portion of at least one optical fiber into an optical fiber connector plug that has a connecting portion using crimp elements to splice the stripped, cleaved and polished end portions of optical fibers to optical fiber stubs located at the front of a connector plug. After completing splices applying a bend relief boot to enclose one end of the connecting portion and engaging a shroud over the other end provides at least one optical fiber terminated by an optical fiber connector plug according to the present invention.

BRIEF DESCRIPTION OF THE DRAWINGS

Notwithstanding any other forms, which may fall within the scope or the present invention, preferred forms of the invention will now be described, by way of example only, with reference to the accompanying drawings in which:

FIG. 11 is a schematic plan view of a pre-assembled connecting portion of a connector plug including an insertion slot and pre-installed optical fiber stubs.

FIG. 12 provides a schematic plan view of a fiber containment body of a connector plug showing relative positioning of a compression element and crimp elements used to form crimp splices during termination of optical fiber cables.

DETAILED DESCRIPTION OF PREFERRED EMBODIMENTS

The following description provides information of several varieties of optical fiber connector plugs and an apparatus, referred to herein as a puck, for use in cleaving and polishing ends of stripped optical fibers to be installed in selected connector plugs. In each case, the puck and connector plugs are adapted particularly for field use and assembly to facilitate convenient custom installation of optical cable networks. Optical fiber connector plugs, described herein, are of the type that use V-grooves to position and align terminal portions of the optical fibers. Figures presented herein are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
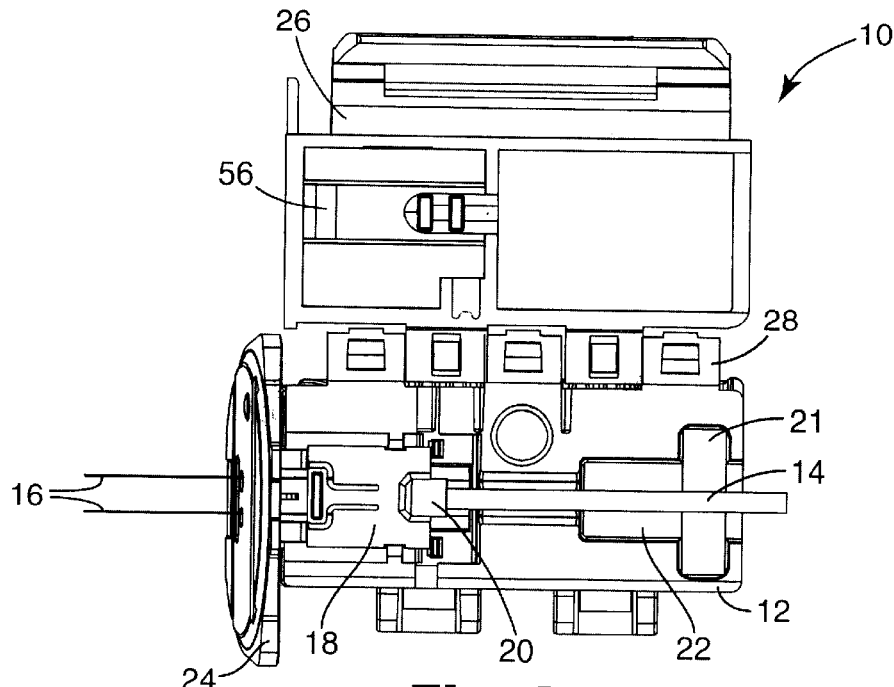
FIG. 1 is a schematic plan view showing an apparatus, referred to herein as a puck that contains optical fibers during cleaving and polishing.

Referring now to the figures wherein like numbers refer to like parts throughout the several views, FIG. 1 is a schematic plan view showing an article referred to in the industry as a puck 10 or polishing puck for use with an optical fiber cleaving and polishing apparatus. The puck 10 is shown in its open position. It includes a housing 12 sized to receive a multi-fiber cable 14 prepared for cleaving of one or more stripped optical fibers 16. Optionally, the puck 10 may be designed to contain single jacketed fibers or several jacketed fibers placed side by side in the puck 10. Preparation of the cable 14 requires removal of optical fiber sheath and buffer layers from each optical fiber 16 contained by the optical fiber cable 14. Removal of the protective sheath and buffer layers exposes stripped optical fibers 16 having sufficient length for insertion into an optical fiber holder 18 so that the optical fibers 16 pass through fiber channels 34, 36 (see FIG. 2) and protrude from the other side of the fiber holder 18 until the outer jacket of the cable 14 abuts a cable stop 44 (see FIG. 3) in the entry port 20 of the holder 18. In an optional embodiment of the holder 18, the fiber channels 34, 36 vary in width along their length in such a way that the a proximal portion of the fiber channels 34, 36, adjacent to the sheathed cable 14, has a width sufficient to accommodate a buffer covered optical fiber 16. Beyond the proximal portion, a distal portion of the fiber channels 34, 36 narrows to only the width of an optical fiber 16 that has been stripped of both sheath and buffer layers. The transition point between the proximal and distal portions of the fiber channels 34, 36 forms a buffer stop preventing movement of optical fibers 16 through the fiber channels 34, 36 of the holder 18 when the lead edge of a buffered optical fiber 16 encounters the buffer stop. An optional transition plate, machined or molded to provide a buffer stop, may be joined to the end of the holder 18, opposite the entry port 20, so that it aligns with the fiber channels 34, 36. Correct positioning of optical fibers 16 in the holder 18 may be achieved, during threading of optical fibers 16, by interference of the jacketed cable with the cable stop 44, by contact of buffer covered fibers 16 with buffer stops, or by the combined effect of both.

After preparation for temporary attachment of the two-part optical fiber holder 18, the optical fiber cable 14 may be installed resting on a resilient pad 21 in an opening 22 in the housing 12. In FIG. 1 the fiber holder 18 occupies a recess (not clearly shown) adjacent to a guide plate 24 having a size and shape for orientation of the puck 10 in a cleaving and polishing apparatus used to produce end-polished optical fibers 16 of precisely cleaved length. It is important that the cable 14 and optical fiber holder 18 be held in a fixed position during cleaving of the optical fibers 16. For this purpose a rotatable lid 26, attached to the housing 12 by a hinge 28, closes over the housing 12 so that the cable 14 and optical fiber holder 18 become immovably trapped between the lid 26 and the housing 12.

Figure 2:
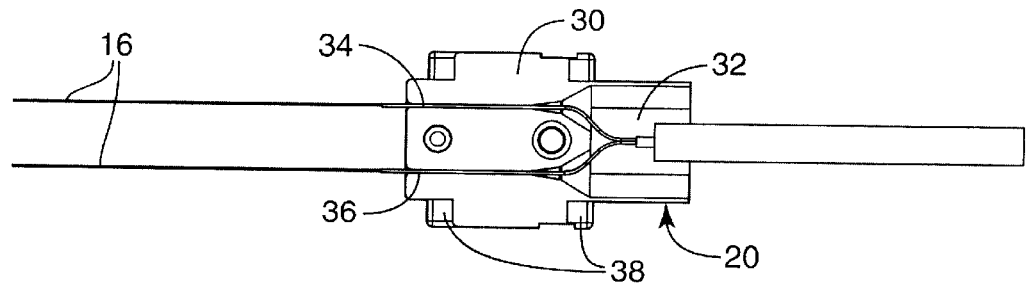
FIG. 2 is a plan view showing a fiber receiving plate of an optical fiber holder having a pair of stripped optical fibers positioned therein.

FIG. 2 shows the structure of the base-plate 30 of a two-part, demountable optical fiber holder 18. The base-plate includes the lower half 32 of the cable entry port 20 that provides access to a first fiber channel 34 and a second fiber channel 36. When installed in the optical fiber holder 18, stripped optical fibers 16 are separated into individual strands that each have sufficient length to occupy one of the channels 34, 36 and extend beyond the end of the holder 18 opposite the entry port 20. The base-plate 30 includes a number of pockets 38 to facilitate sliding engagement of a cover-plate 40 with the base-plate 30.

Figure 3:
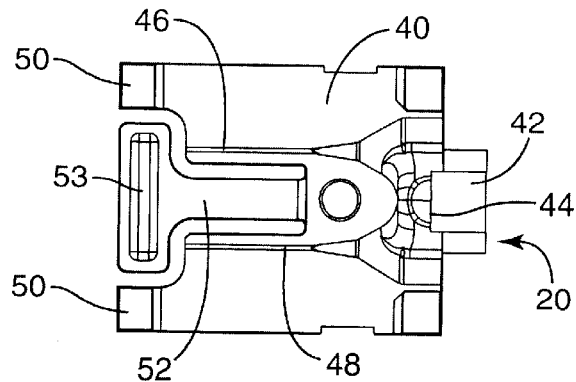
FIG. 3 is a plan view of a cover plate of an optical fiber holder according to the present invention.

FIG. 3 shows the structure of the underside of a cover-plate 40 that is the second part of a demountable optical fiber holder 18 according to the present invention. The cover-plate 40 includes the upper half 42 of the entry port 20 that has a cable stop 44 to limit the amount of the jacket of the optical fiber cable 14 that enters the assembled fiber holder 18. A first upper channel 46 and a second upper channel 48 have axial alignment with the first fiber channel 34 and the second fiber channel 36 to enclose the stripped optical fibers 16 when the cover-plate 40 engages the base-plate 30. Engagement of these two parts 30, 40 occurs when posts 50 slide into the pockets 38 in the base-plate 30 to produce an assembled optical fiber holder 18. An important feature of an optical fiber holder 18 according to the present invention is a spring clamp 52 integrally formed with the cover-plate 40 to flex towards the optical fibers 16 to immovably clamp them in the fiber channels 34, 36 during application of a biasing force. As illustrated in FIG. 3, the spring clamp 52 is a T-shaped cantilever that includes a fiber contact bar 53 on one surface and a compression bar 54 (see FIG. 4) on the surface opposite the contact bar 53.

Figure 4:
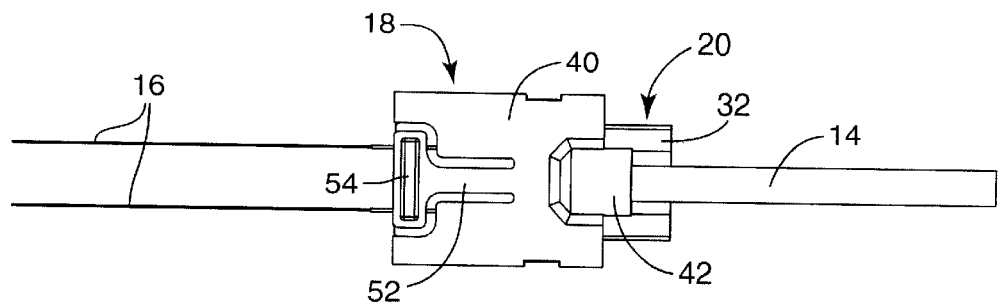
FIG. 4 is a plan view showing an optical fiber holder assembled to contain at least one optical fiber.

FIG. 4 shows an assembled optical fiber holder 18 applied to an end of an optical fiber cable 14 with stripped optical fibers 16 protruding from the optical fiber holder 18. Although described previously with reference to the separated components, the optical fiber holder 18 is typically assembled and placed in the recess of the puck 10 before threading the stripped fibers 16 through the holder 18.

The process of attaching a fiber holder 18 to an optical fiber cable 14 requires first removal of the jacket from the cable 14 followed by stripping of the sheath and buffer from a length of each individual optical fiber 16 that exceeds the length dimension of the optical fiber holder 18. Stripped optical fibers 16 reach their positions inside the fiber holder 18 by inserting the optical fibers 16 into the entry port 20 of an assembled holder 18 and gently guiding them through the channels 34, 48; 36, 46 so that they pass the spring clamp 52 to protrude beyond the end of the holder 18. Movement of the optical fibers 16 through the channels 34, 48; 36, 46 ceases when the jacket of the multi-fiber cable 14 encounters the cable stop 44 inside the cable entry port 20, or the buffered fiber encounters the buffer stop. Consistent positioning of the optical fiber cables 14 against the cable stop 44 (see FIG. 3) or buffer stop results in cleaving of stripped optical fibers 16 to precise, consistent length.

Figure 5:
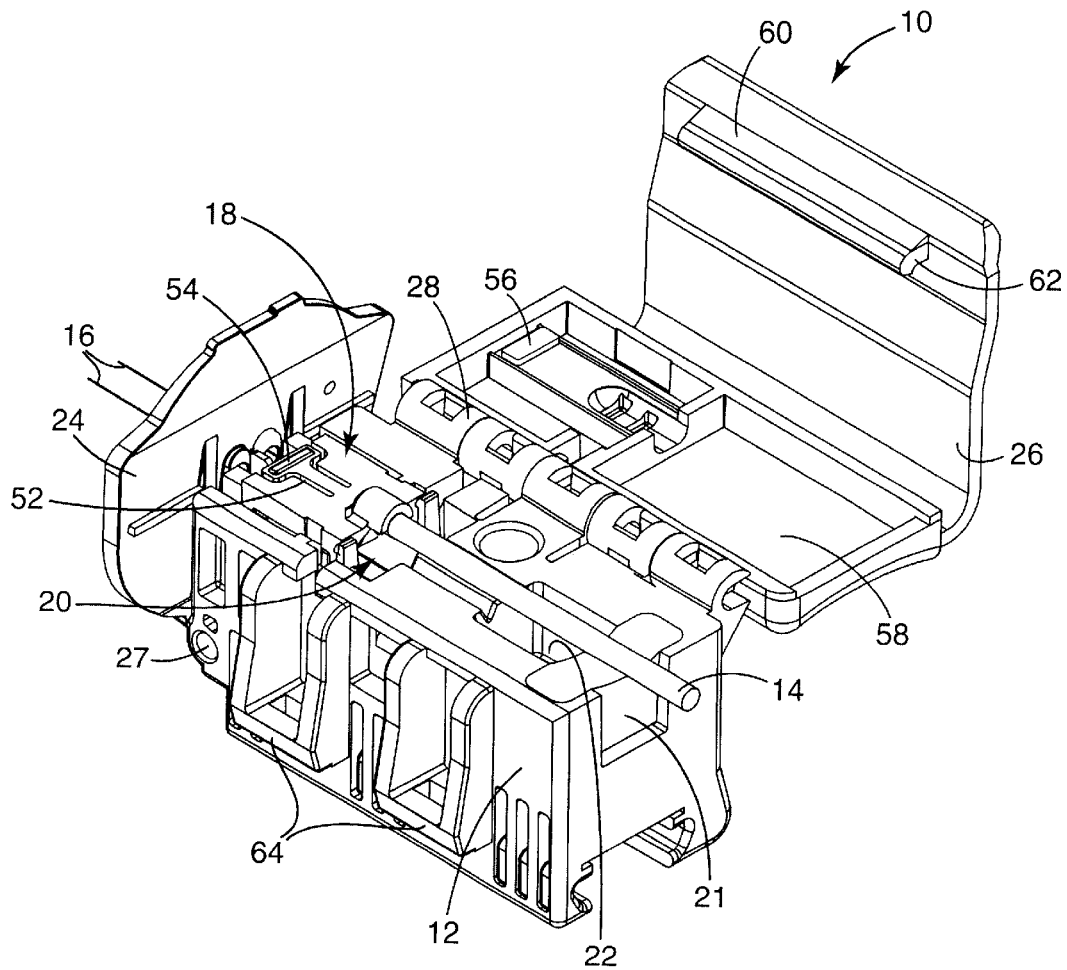
FIG. 5 is a perspective view of an apparatus, used to contain optical fibers during cleaving and polishing, showing positioning of an optical fiber holder and jacketed optical fiber cable.

FIG. 5 is a perspective view showing the relative positioning of an optical fiber holder 18 and the terminal portion of an optical fiber cable 14 inside the housing of a puck 10 according to the present invention. The optical fiber holder 18 fits into a recess (not clearly shown) and the cable 14, extending from the fiber holder entry port 20, rests against a resilient pad 21 residing in the opening 22 to support the optical fiber cable 14. Stripped optical fibers 16, extending from the optical fiber holder 18, protrude through openings in the guide plate 24 in a position for cleaving level with the front surface of the guide plate 24 after latching of the lid 26 of the puck 10. Pressure applied to the compression bar 54 of the spring clamp 52 will move the contact bar 53 (not shown) into a gripping relationship with the optical fibers 16 holding them in a fixed position during cleaving.

The rotatable lid 26 includes a pressure bar 56 and a pressure plate 58 that apply pressure against the optical fiber holder 18 and the optical fiber cable 14 when the lid 26 is rotated about the hinge 28 for latching against the housing 12. Any number of latching mechanisms may be used to effectively retain the rotatable lid 26 in contact with the housing 12. As illustrated, in FIG. 5, a latch 60 includes an elongate bar having a hooked edge 62. In its fully closed position, the hooked edge 62 of the rotatable lid 26 grips ledge segments 64 molded into the housing 12 of the puck 10. The pressure bar 56 and the pressure plate 58 of the closed and latched lid 26 exert pressure against the compression bar 54 of the spring clamp 52 and optical fiber cable 14 respectively in such a way that the cable 14 becomes immobilized between the pressure plate 58 and the pad 21 and the stripped optical fibers 16 become fixed in the fiber channels 34, 36 using the force transmitted from the compression bar 54 through the spring clamp 52 to the contact bar 53.

Figure 6:
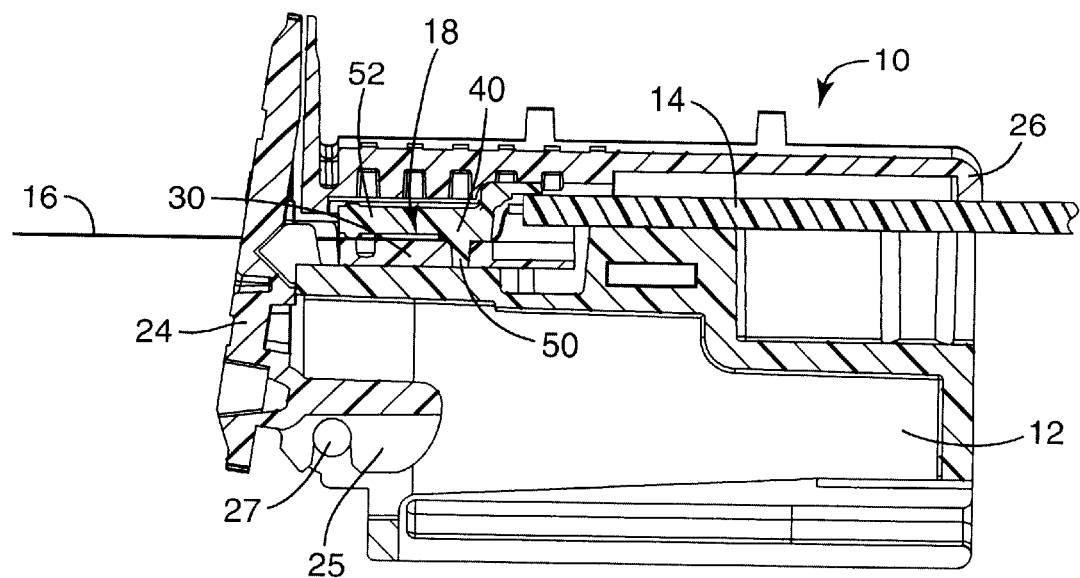
FIG. 6 is a cross sectional side view showing the closed and latched position of an apparatus used to contain optical fibers during cleaving and polishing.

FIG. 6 is a side cross sectional view showing a puck 10 in its closed position wherein a terminal portion of an optical fiber cable 14 and a demountable optical fiber holder 18 have been releasably secured in preparation for cleaving the excess length from the optical fibers 16 protruding from the openings in the guide plate 24 of the puck 10.

The process of cleaving and polishing, described below, is presented in greater detail in U.S. Pat. No. 6,099,392 that is commonly owned with the present application. One result of the cleaving and polishing process is the production of polished end faces on multiple optical fibers of which the stripped terminal portions have been cleaved to be of equal length. A puck 10 or polishing puck according to the present invention uses the guide plate 24 as a mating component that seats in a pair of opposing tracks of an optical fiber cleaving and polishing device described in U.S. Pat. No. 6,099,392. Between the guide tracks, a groove provides space to accommodate the excess lengths of optical fiber 16 extending from the openings in the guide plate 24 when it slides in the tracks. As the polishing puck 10 slides along the guide tracks it approaches and contacts a sharpened edge where cleaving of the fibers 16 occurs. The guide tracks of the cleaving and polishing device extend a short distance beyond the sharpened edge before releasing the puck 10. This maintains the orientation of the guide plate 24 for a short distance beyond the point of cleaving of the fibers 16.

It is known that several measurable parameters of an optical fiber end face affect the quality of signal transmission of an optical fiber connection. Such parameters include the angle of the optical fiber end face and its planarity and surface smoothness. End-face angle is important for full face-to-face contact between spliced or connected optical fibers. Surface roughness and lack of surface planarity also interfere with contact between end faces of spliced or connected optical fibers.

Earlier evidence suggested the need for an end face at an angle of 90° to the optical fiber axis. According to the present invention, after satisfying planarity and surface smoothness requirements, a further improvement of signal transmission is possible when the angle of the end face to the optical fiber axis is slightly more than 90°. Expressed in terms of angular deviation from perpendicular to the fiber axis, evidence shows that an end face angle less than about 10° and preferably 8° provides signal improvement with less attenuation. End face angle adjustment depends upon the construction of the puck 10 used for preparing terminal portions of stripped optical fibers 16 according to the present invention. Referring to FIG. 6, the guide plate 24 is attached to pivot relative to the housing 12 using a pivot mechanism that includes a hook 25 in frictional contact with a pivot post 27. The pivot mechanism allows movement of the guide plate 24 between a closed position, as shown in FIG. 6, and an open position in which the guide plate 24 releases the optical fiber ends from the openings they occupied during cleaving and polishing. In its closed position, the angle of the guide plate 24 to the axis of the optical fibers 16 differs from perpendicular by the desired amount less than 10°. Positioning of the guide plate 24 in the guide tracks, of the cleaving and polishing device, determines the angle between the optical fibers 16 and the sharpened edge at the point of cleavage. It will be appreciated that the angle of cleavage can be changed depending on the position and angle of the guide plate 24 to the axis of the optical fibers 16.

After passing the sharpened edge and releasing from the guide tracks of the cleaving device, the exposed surface of the guide plate 24 stabilizes the orientation of the cleaved end faces of the optical fibers 16 against a lapping surface provided with the cleaving and polishing device. Movement of the puck 10 against the lapping surface, using several strokes of a pre-determined pattern, causes smoothing and polishing of the cleaved end faces of the optical fibers 16.

Completion of the cleaving and polishing process provides one or more optical fibers 16 of prescribed length and having a polished end face. The puck 10 contains a pair of optical fibers 16 that have been prepared to have equal length. Thus prepared, the optical fibers 16 may be released from the openings in the guide plate 24 by pivoting the guide plate 24 away from the housing 12. The cable 14 may be removed from the puck 10, with the holder 18 attached, after the lid 26 has been unlatched and rotated away from the housing 12. With removal of the jacketed cable from the resilient pad 21, the holder 18 may be lifted out of the recess. The cover plate 40 may be separated from the base-plate 30 of the demountable holder 18 by withdrawing the posts 50 of the cover plate 40 from the pockets 38 formed in the base plate 30. This provides a jacketed optical fiber cable 14 having an end portion from which the jacket was removed for preparation of bare end portions of optical fibers 16 that, after preparation by cleaving and polishing, are of substantially equal length and have polished end faces for substantially full-face contact with end faces of pre-installed optical fiber stubs in e.g. connector plugs according to the present invention.

Figure 7:
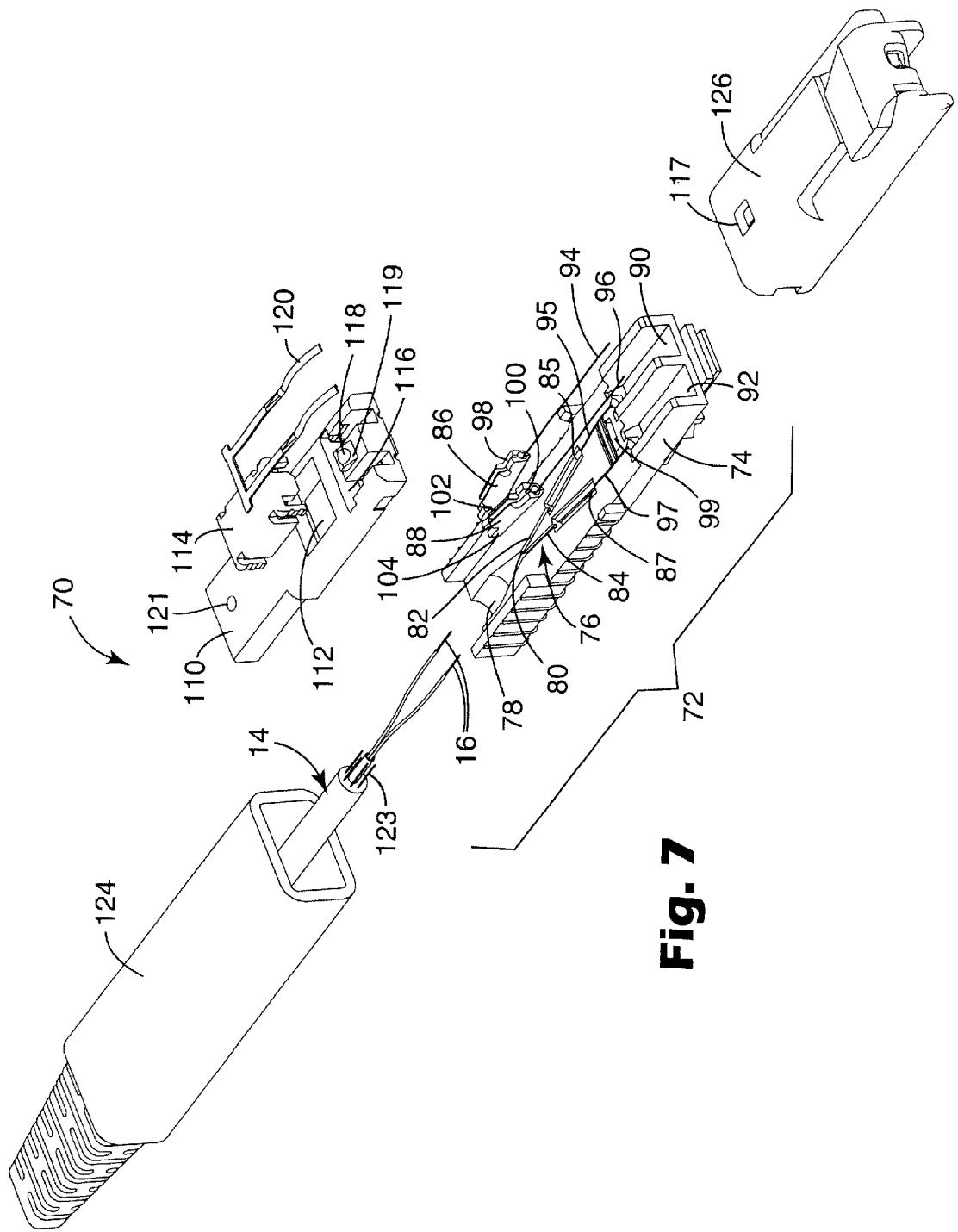
FIG. 7 is an exploded perspective view of one embodiment of a connector plug designed to contain optical fibers.

FIG. 7 provides an exploded perspective view of an optical fiber connector plug 70 according to the present invention including a terminal portion of an optical fiber cable 14 showing two stripped, cleaved and polished optical fibers 16 of selected, equal length as they would appear following preparation using a puck 10 and a cleaving and polishing device, as described previously. The use of fibers 16 of equal length provides the key to field assembly of optical fiber connector plugs 70 for optimum signal transmission. A molded connecting portion 72 includes additional features and components that further increase the probability of optimal field assembly of a connector plug 70 according to the present invention. A connecting portion 72 comprises a fiber containment body 74 including a structured floor 76 having a rear entry 78, extending to a junction 80 of a first fiber groove 82 and a second fiber groove 84. The grooves 82, 84 have a height slightly greater than the diameter of a buffer coated optical fiber 16 and extend on diverging paths into a central region of the fiber containment body 74 before terminating at a first elongate depression 85 and a second elongate depression 87, which act as seats for a first crimp element 86 and a second crimp element 88 respectively. Each of the crimp elements 86, 88 has limited movement in an elongate depression 85, 87 in the floor 76 of the fiber containment body 74. Correct positioning in each elongate depression 85, 87 provides alignment of the longitudinal axes of the crimp elements 86, 88 and the respective grooves 82, 84 used to guide the optical fibers 16 into the crimp elements 86, 88.

The end of the fiber containment body 74 opposite the rear entry 78 includes a first fiber stub exit 90 parallel to and separated from a second fiber stub exit 92. Each fiber stub exit 90, 92 accommodates a factory installed optical fiber stub 94, 96 inserted into a stub channel 95, 97 that leads to the front end 98, 100 of a crimp element 86, 88. After insertion of equal amounts of fiber stubs 94, 96 into the front ends 98, 100 of the crimp elements 86, 88, approximately one half of the length of the bore of each of the crimp elements 86, 88 contains a portion of an optical fiber stub 94, 96 adhesively secured in an adhesive open-ended tray 99 adjacent to the front ends 98, 100 of the crimp elements 86, 88.

A molded top 110 placed over the fiber containment body 74 completes a pre-assembled connecting portion 72 prepared for insertion of the cleaved and stripped end portions of an optical fiber cable 14. The underside of the molded top 110 has no fiber channels matching those 82, 84 formed in the fiber containment body 74. A rectangular hole 112 in the molded top 110 accommodates a compression element 114 designed to close the crimp elements 86, 88 between their front ends 98, 100 and rear ends 102, 104 during the formation of crimp splices of optical fibers 16 to optical fiber stubs 94, 96. The compression element 114 occupies two positions relative to the crimp elements 86, 88. In its first or fiber-load position the compression element 114 passes through the rectangular hole 112 into a gripping relationship with the crimp elements 86, 88 to narrow the bore of each crimp elements 86, 88. Narrowing of the bore of each crimp element 86, 88 provides enough space for sliding entry of the ends of the optical fibers 16 but prevents escape of the optical fibers 16 through the side openings of the crimp elements 86, 88. Application of force moves the compression element 114 to its second or crimp position further inside the rectangular hole 112. Raised features on the inner face of the compression element 114 apply a lateral force to the sides of the crimp elements 86, 88 as the compression element 114 moves to its crimp-position. Application of lateral force further narrows the bore of each crimp element 86, 88 to form a crimped splice that secures the ends of the optical fibers 16 and the fiber stubs 94, 96 so that there is coaxial alignment and full-face contact between these components. The resulting crimped splice resembles that formed using crimp elements commercially available from 3M Company, St. Paul, Minn. under the trade name FIBRLOK™. Further description of crimp elements of this type exists in U.S. Pat. No. 5,638,477 and related patents that are commonly owned with the present application.

A rectangular trough 116, formed in the molded top 110, provides a seat for a biasing element 120 and surrounds an adhesive injection port 118 formed through a shroud catch 119. Adhesive, injected through the injection port 118, accumulates in the open-ended tray 99 to adhesively secure portions of the fiber stubs 94, 96 that pass the ends of open-ended tray 99 and become bonded by the adhesive as it cures during exposure to ultraviolet radiation. The biasing element 120 resists bending of the optical fiber stubs 94, 96 during insertion of an optical fiber connector plug 70 into a mating socket (not shown) to form a face-to-face optical fiber connection that introduces a compressive force at the fiber-to-fiber interface.

A molded connecting portion 72, shown in FIG. 7 in exploded view, is normally factory assembled to include optical fiber stubs 94, 96 secured, as described previously, using a photocurable adhesive injected into the open-ended tray 99 adjacent to the front ends 98, 100 of the crimp elements 86, 88. Factory assembly using an interlocking mechanism to secure molded tops 110 to fiber containment bodies 74 provides connecting portions 72 offering not only field termination of optical fiber cables, but including preferred optical fiber stubs 94, 96, fabricated using GGP (glass/glass/polymer) fibers, that have greater resistance to bending fracture than ordinary optical fibers. Regardless of the type of optical fiber used in optical fiber network cables, a plug and socket connection benefits from the use of GGP optical fiber stubs 94, 96 even though the crimp splice inside the connecting portion 72 of a connector plug 70 includes other optical fibers 16, i.e. non-GGP fibers, from the optical fiber cable 14. As supplied for attaching to a terminal portion of an optical fiber cable 14, the molded connecting portion 72, resides inside a two-part enclosure 122.

Figure 8:
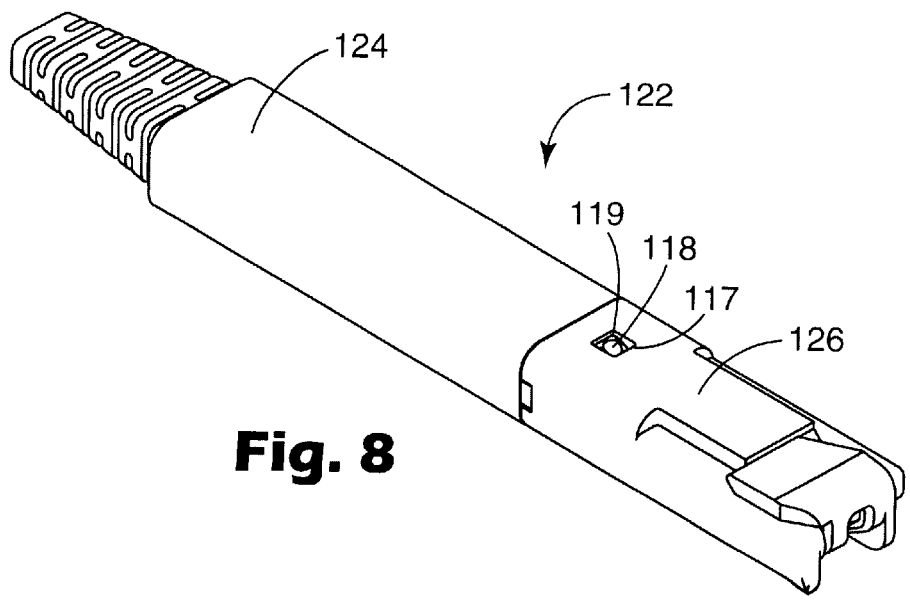
FIG. 8 is a perspective view of a connector plug according to the present invention.

FIG. 8 provides a perspective view of a two-part enclosure 122 according to the present invention including a bend relief boot 124 and protective shroud 126. Before inserting cleaved and polished optical fibers 16 into the connecting portion 72 of the optical fiber connector plug 70, the bend relief boot 124, supplied with a connector plug 70 assembly kit, is placed around the optical fiber cable 14, as shown in FIG. 7. Holding the stripped optical fibers 16 between thumb and forefinger, an installer introduces slight diverging separation between the fibers 16 and then inserts them into the rear entry 78 of the molded connecting portion 72. Slight diverging separation of the optical fibers 16 is needed to assist entry of the fibers 16 into one of the first 82 or second 84 fiber grooves. Correctly positioned fibers 16 adopt the same V-shaped relationship as the grooves 82, 84 into which they are inserted. Care is required while threading the stripped optical fibers past the junction 80 to prevent crossover of the optical fibers 16 placing them in an X-shaped relationship and misdirecting light signals passing through an optical fiber connector plug 70 of this type. After successful insertion of optical fibers 16 in the fiber grooves 82, 84 the optical fiber cable 14 enters the rear entry 78 and the end of each optical fiber 16 extends into the first 102 and second 104 rear ends of the crimp elements 86, 88 making face-to-face contact with the faces of the optical fiber stubs 94, 96 already securely positioned in the front ends 98, 100 of the crimp elements 86, 88. Final connection of the optical fibers 16 requires application of downward force to the compression element 114 to secure the optical fibers inside the crimp elements 86, 88. Upon completion of the splice between the stripped optical fibers 16 and the optical fiber stubs 94, 96, adhesive, injected through the injection orifice 121, bonds the KEVLAR™ fiber layer 123 of the optical cable 14 to the wall of the rear entry 78 to provide strain relief. The bend relief boot 124 may then be slid forward along the optical fiber cable 14 to grip and enclose a portion of the connecting portion 72 corresponding to the boundary with the front ends 98, 100 of the crimp elements 86, 88. Final assembly of the connector plug 70 requires attachment of the protective shroud 126 by engagement between the shroud aperture 117 and the shroud catch 119 to provide the two-part enclosure 122 that protects the connecting portion 72.

Figure 9:
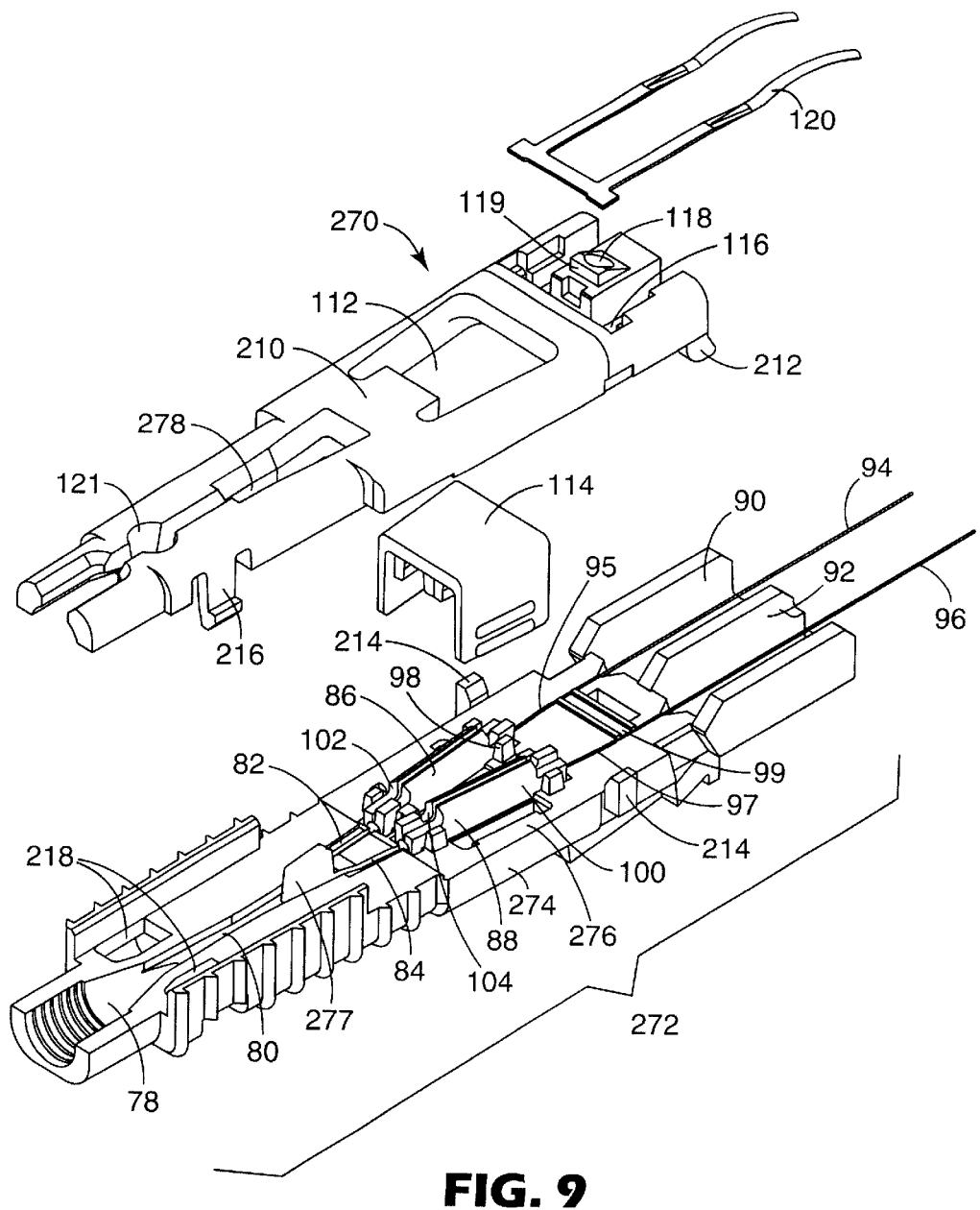
FIG. 9 is an exploded perspective view of a second embodiment of a connector plug including an insertion slot to facilitate positioning of optical fibers in the connector plug body.

FIG. 9 provides an exploded perspective view of a second embodiment of an optical fiber connector plug 270 according to the present invention including a molded connecting portion 272 that includes additional features to further increase the probability of optimal field assembly of a connector plug 270 according to the present invention. A connecting portion 272 comprises a fiber containment body 274 including a structured floor 276. The structured floor 276 has essentially the same features as the previously described structured floor 76 including a rear entry 78, extending to a junction 80 of a first fiber groove 82 and a second fiber groove 84 and first 86 and second 88 crimp elements. In addition to these features, the fiber containment body 274 further includes a tapered wall 277, molded into the floor 276 between the first fiber groove 82 and the second fiber groove 84, to prevent crossover of optical fibers 16, thereby directing them towards the correct crimp elements 86, 88 for maintaining optical signal integrity.

Other features in common with the previously described fiber containment body 74 include a first fiber stub exit 90 parallel to and separated from a second fiber stub exit 92. Each fiber stub exit 90, 92 accommodates a factory installed optical fiber stub 94, 96 inserted through a stub channel 95, 97 for precise positioning, into the front end 98, 100 of a crimp element 86, 88. As before, after insertion of equal amounts of fiber stubs 94, 96 into the front ends 98, 100 of the crimp elements 86, 88 approximately one half of the length of the bore of each of the crimp elements 86, 88 contains a portion of an optical fiber stub 94, 96 adhesively secured at the ends of an open-ended tray 99 adjacent to the front ends 98, 100 of the crimp elements 86, 88.

A molded top 210 placed over the fiber containment body 274 completes a pre-assembled connecting portion 272 prepared for insertion of cleaved and stripped end portions of an optical fiber cable 14. As described previously, an interlocking mechanism provides secure attachment of a molded top 210 to a fiber containment body 274. FIG. 9 clearly shows components used to interlock a molded top 210 with a fiber containment body 274. The interlocking mechanism includes barbs 212 on opposing sides at the front of the top 210 that engage projections 214 on the fiber containment body 274 to position clasps 216 at the rear of the top 210 so that they interlock with through-holes 218 as the molded top 210 folds down toward the containment body 274.

The molded top 210 includes the substantially rectangular hole 112 to accommodate a compression element 114 that closes the crimp elements 86, 88 during the formation of crimp splices between optical fibers 16 and optical fiber stubs 94, 96. A rectangular trough 116, formed in the molded top 210, surrounds an injection port 118 and provides a seat for a biasing element 120 used to restrict movement of the optical fiber stubs 94, 96 after insertion of a connector plug 270 into a connector receptacle (not shown).

Although similar to the molded top 110 described above, the molded top 210 of the second embodiment of an optical fiber plug 270 further includes a longitudinal slot 278 extending from the rear entry 78 approximately to the middle of the molded top 210. The slot 278 provides better access to the grooves 82, 84, overcoming the possibility that fibers 16 inserted through the rear entry 78 will cross over as they pass the junction 80. Optical fibers 16, placed in the slot 278, encounter the tapered wall 277 that protrudes into the slot 278 to keep the fibers 16 separated and directed towards the grooves 82, 84 for crimp splice formation to ensure optical signal integrity. Installation of stripped optical fibers 16 in the slot 278 preferably involves gripping the fibers 16 between thumb and forefinger, as before, so that the fibers 16 diverge slightly from each other. This facilitates placement of the optical fibers 16 in the slot 278 and on either side of the tapered wall 277. After placing the stripped optical fibers 16 in their respective grooves 82, 84, the jacketed portion of the optical fiber cable 14 may be moved towards the rear entry 78 so that the optical fibers 16 slide forward into the crimp elements 86, 88 and take up the desired position abutting the ends of the optical fiber stubs 94, 96. The distance between the point of insertion of the optical fibers 16 and the crimp elements 86, 88, in this embodiment of an optical fiber connector plug, is less than for the embodiment discussed previously. This is an added benefit, which lowers the possibility of unprotected, bare ends of the optical fiber 16 becoming damaged and chipped by inadvertent contact with the walls of the fiber grooves 82, 84 during insertion of the optical fibers 16 for splicing.

Figure 10:
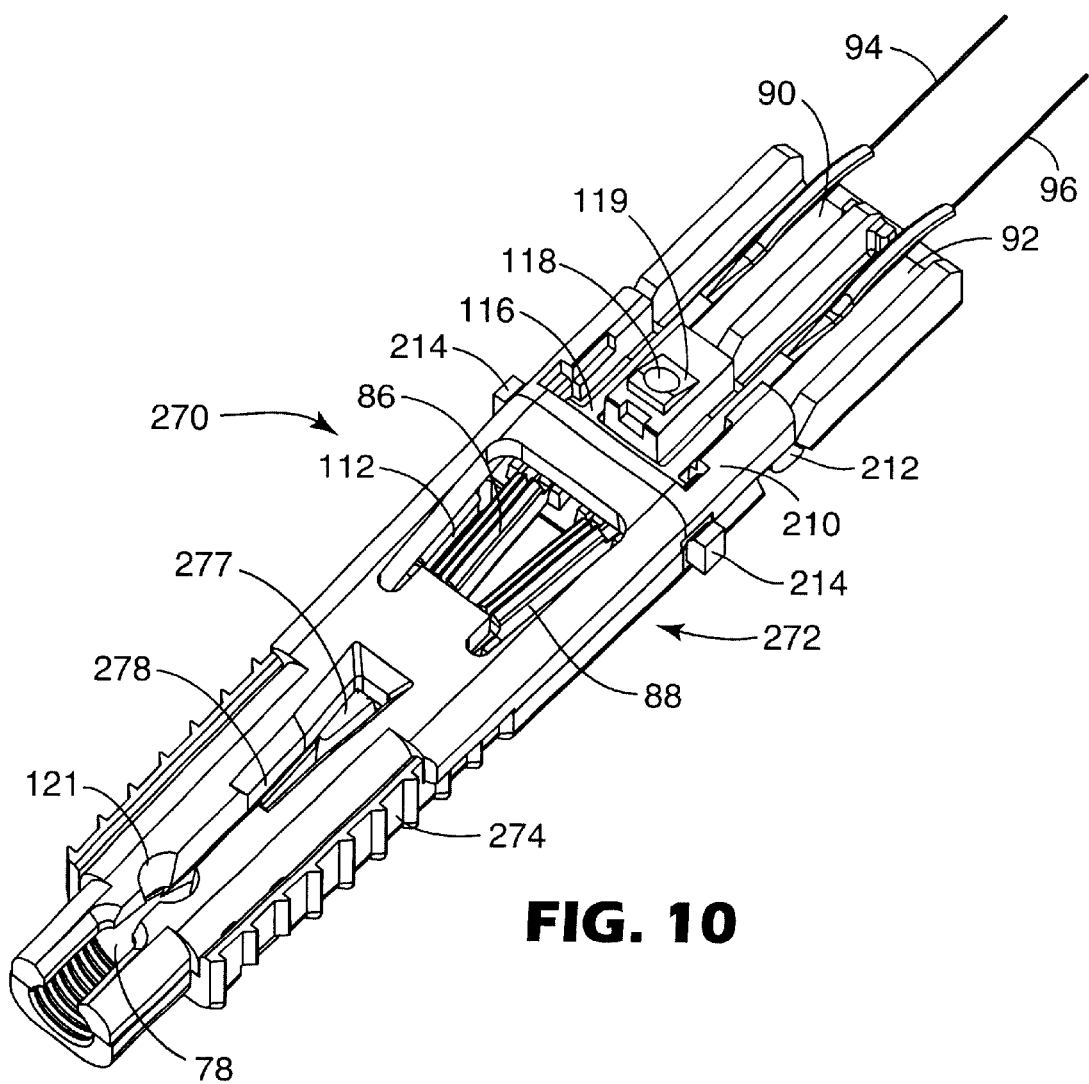
FIG. 10 is a perspective view of a pre-assembled connecting portion of a connector plug according to the present invention.

FIG. 10 and FIG. 11 provide a perspective view and schematic plan view respectively of a pre-assembled connecting portion 272 prepared for insertion of cleaved and stripped end portions of an optical fiber cable 14. Using this version of a connecting portion 272 of a connector plug 270 according to the present invention, the tips of cleaved and polished optical fibers 16 may be positioned above the tapered wall 277 and lowered into the slot 278 so that they fall on either side of the tapered wall 277. Thus separated, the optical fibers 16 maintain the divergent relationship needed for accurate placement of the stripped optical fibers 16 in the fiber grooves 82, 84. Using the fiber cable 14 to move the optical fibers 16 further into the connecting portion 272, the tips of the optical fibers 16 follow the fiber grooves 82, 84 before entering the crimp elements 86, 88. Resistance to further movement indicates that there is abutment between the end faces of the optical fibers 16 and the fiber stubs 94, 96. Movement of the compression element 114 from its fiber-load position to its crimp position captures the ends of the optical fibers 16 and the fiber stubs 94, 96 to provide a crimp splice as described previously. As before, formation of an adhesive bond between the KEVLAR™ fibers 123 of the optical fiber cable 14 and the walls of the rear entry 78 of the connecting portion 272 provides strain relief between the cable 14 and a connector plug 270 according to the present invention.

FIG. 12 is a schematic diagram of a fiber containment body 274 of a connector plug 270 showing the relative locations of the end of the jacketed cable 14, the stripped optical fibers 16 and particularly the relationship of the compression element 114 to the crimp elements 86, 88. As illustrated, the end of the optical fiber cable 14 occupies the rear entry 78 of the fiber containment body 274 with terminal portions of the stripped optical fibers 16 residing in the first fiber groove 82 and the second fiber groove 84 and extending into the crimp elements 86, 88 after diverging by separation at the tapered wall 277. Application of pressure to the compression element 114 produces a crimp splice between each optical fiber 16 and its respective factory installed fiber stub 94, 96. The diagram of FIG. 12 shows that the compression element 114 applies force to form crimp splices between the front ends 98, 100 and rear ends 102, 104 of the crimp elements 86, 88.

Figure 13:
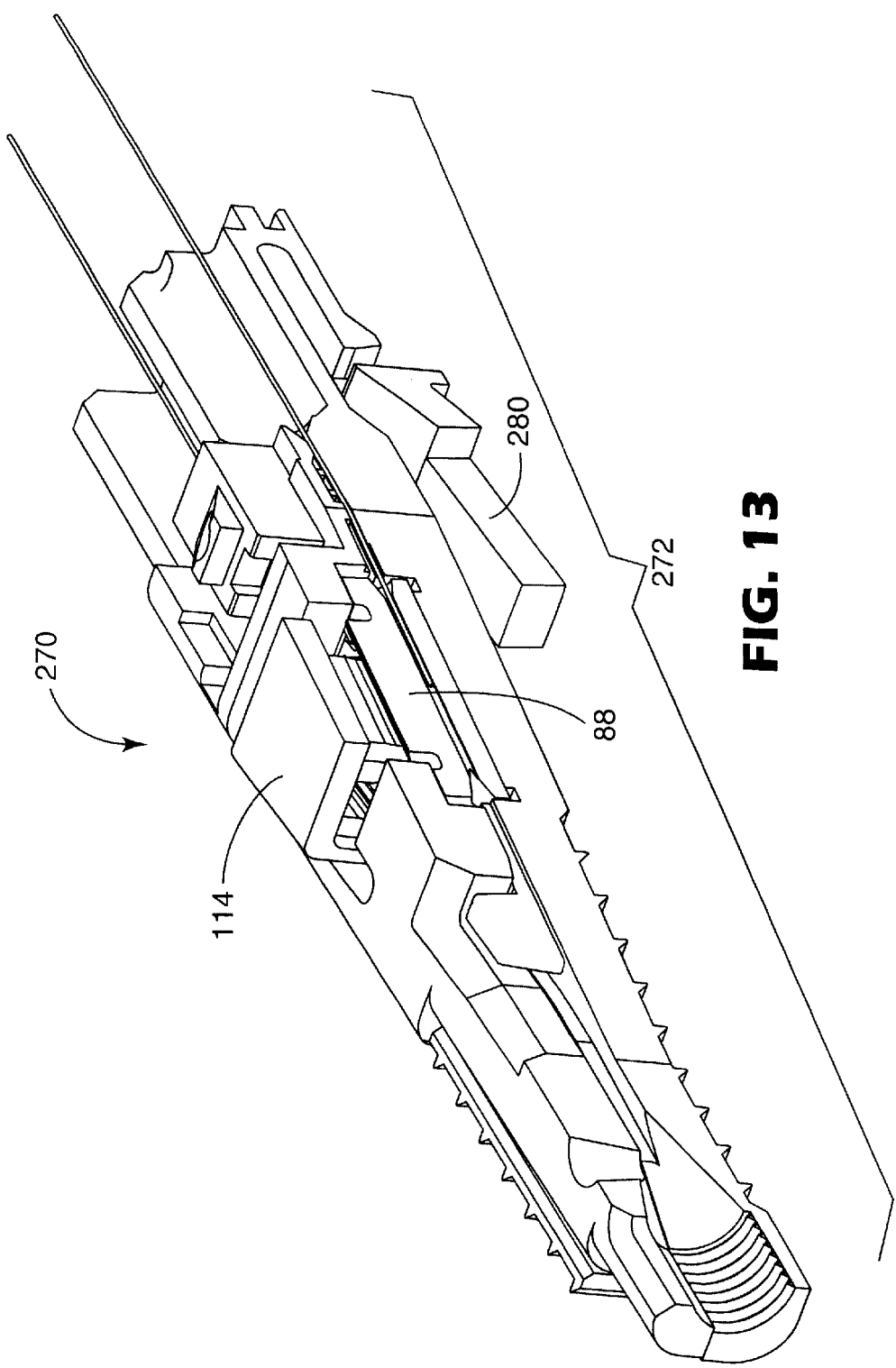
FIG. 13 is a cutaway perspective view showing a pre-assembled connecting portion of a connector including a latch to retain the connector plug in contact with the connector receptacle of an optical fiber connecting assembly.

FIG. 13 provides a perspective cut-away view taken through line 13—13 of FIG. 11 to show a factory assembled connecting portion 272 of a connector plug 270 according to the present invention. As illustrated, the compression element 114 is in its fiber-load position that allows the terminal portions of optical fibers 16 to enter the crimp elements 86, 88 unimpeded. This view also reveals a plug latch 280 used as a means for retaining a connector plug 270 in secure mating relationship with a connector receptacle.

Figure 14:
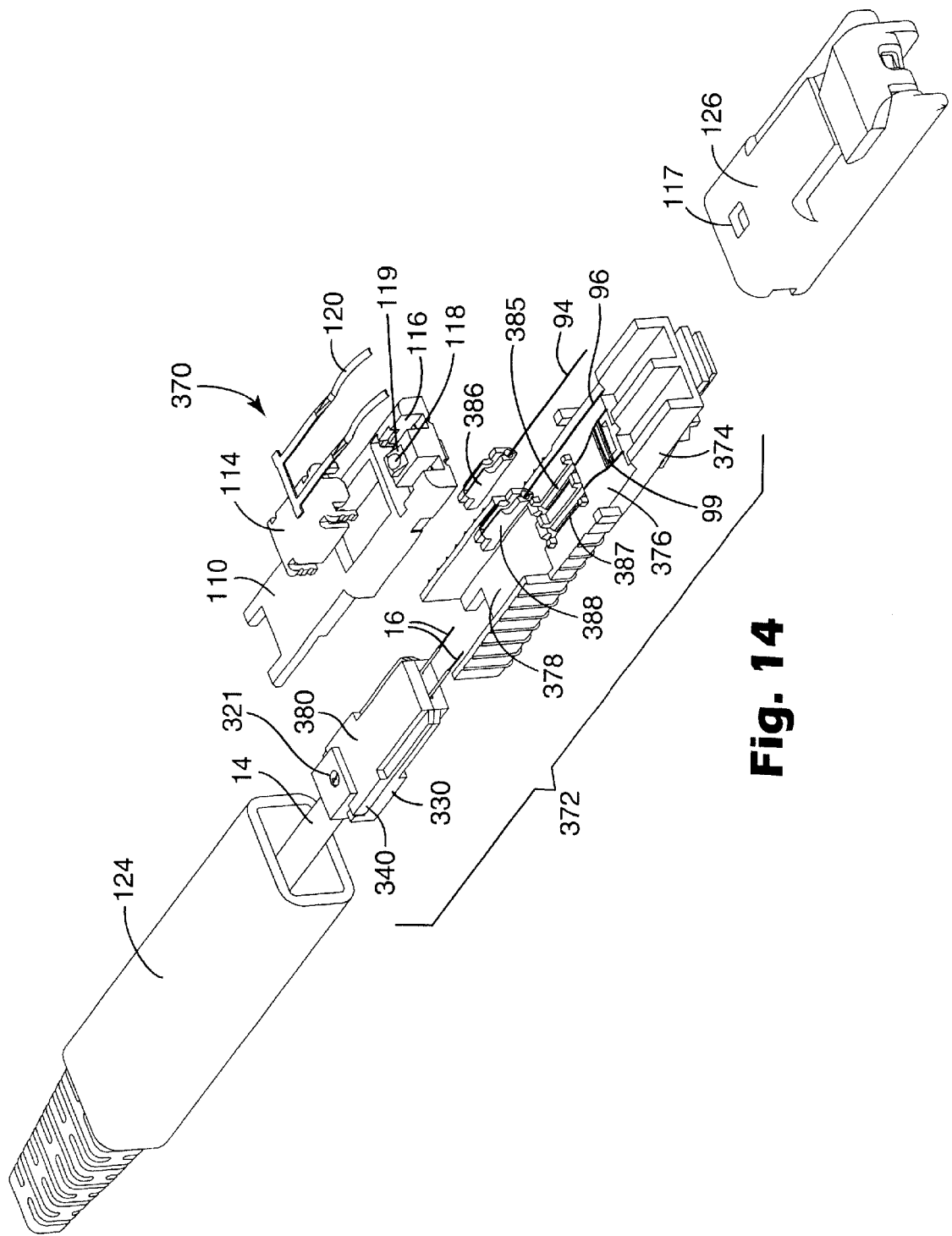
FIG. 14 is an exploded perspective view of a third embodiment of a connector plug including a fiber positioner to facilitate positioning of optical fibers in a connector plug body.

FIG. 14 provides an exploded perspective view of a third embodiment of an optical fiber connector plug 370 suitable for field installation in situations where termination of an optical fiber cable 14 does not require installer dexterity associated with feeding stripped terminal portions of optical fibers 16 into channels 82, 84 or a slot 278 formed in pre-assembled connecting portions 72, 272 described previously. Instead, an installer has the option of field terminating one or more optical fibers 16 by applying a permanent fiber positioner 380 that may be used with a polishing puck 10 in place of the demountable, temporary optical fiber holder 18 described above. A permanent fiber positioner 380 includes a base-plate 330 connected to a cover-plate 340 in such a way that the positioner 380 is difficult to re-open after preparing the cable 14, to remove sheath and buffer layers and inserting the terminal portions of optical fibers 16 through channels in the positioner 380 and openings in the puck guide plate 24. After preparation for substantially permanent attachment of the two-part fiber positioner 380, the optical fiber cable 14 may be installed in the puck 10, immobilized therein after latching the rotatable lid 26 (see e.g. FIG. 5 or FIG. 6). Cleaving and polishing of the terminal portions of the optical fibers 16, protruding from the face of the guide plate 24, proceeds with the optical fibers held immobile using the optical fiber positioner 380. The cleaving and polishing device and process, in this case, is no different to those used with the temporary holder 18 that was illustrated in e.g. FIG. 5. As before the cleaving and polishing process is capable of producing multiple fibers of equal length for insertion into a connecting section 372 of a connector plug 370 according to the present invention.

The cable 14 may be removed from the puck 10, with the optical fiber positioner 380 attached, after the lid 26 has been unlatched and rotated away from the housing 12. With removal of the jacketed cable from the resilient pad 21, the fiber positioner 380 may be lifted out of the recess and retained on the end of the optical fiber cable 14. This maintains a parallel relationship between the terminal portions of optical fibers 16 before insertion into the molded connecting portion 372 of a connector plug 370. Adhesive, injected through a bonding port 321 bonds KEVLAR™ strands (not shown), surrounding the sheathed optical fibers 16, to the optical fiber positioner 380 to provide strain relief for the optical fiber cable 14.

A molded connecting portion 372 includes features for optimal field assembly of a connector plug 370 according to the present invention. A connecting portion 372 comprises a fiber containment body 374 including a structured floor 376. A factory pre-assembled connecting portion 372 includes, as before, adhesively bonded GGP optical fiber stubs 94, 96. In this embodiment the rear entry 378 has been modified to accommodate the fiber positioner 380 that pre-positions the stripped optical fibers 16 in parallel relationship. Also, in this embodiment there is no need for a junction or diverging fiber grooves because the optical fibers 16, held parallel by the fiber positioner 380, have the required alignment to feed directly into the crimp elements 386, 388 that now have a parallel relationship to one another in corresponding elongate depressions 385, 387. In common with earlier embodiments of the present invention, a compression element 114 operates between a fiber-load position and a crimp position to adjust the bore size of each crimp element 386, 388 for formation of a splice of the optical fibers 16 in abutment with the fiber stubs 94, 96. After inserting an optical fiber positioner 380 in the rear entry 378, and actuating the compression element 114 to its splice-forming crimp position, the bend relief boot 124 and shroud 126 may be moved into position to enclose the connecting portion 372 and complete the field assembly of the connector plug 370. The size of the optical fiber positioner 380 requires an increase in the overall size of this embodiment of a connector plug 370, which may be a disadvantage compared to earlier embodiments of the present invention. Regardless of size, this version of a connector plug 370 is useful for facilitating field termination of optical fiber cables.

As required, details of the present invention are disclosed herein; however, it is to be understood that the disclosed embodiments are merely exemplary and not to be interpreted as limiting, but merely as a basis for the claims and as a representative basis for teaching one skilled in the art to variously employ the present invention.

What is claimed is:

1. An optical fiber connector plug for mating with an optical fiber receptacle to form an optical fiber connection, said optical fiber connector plug comprising:
  a connecting portion comprising:
    a containment body including a rear entry formed therein at a first end thereof and a first fiber stub exit opening to a first fiber stub channel, said first fiber stub exit being parallel to a second fiber stub exit opening to a second fiber stub channel, said first and second fiber stub exits being formed at a second end opposite said first end of said containment body, said rear entry dividing at a junction into a first fiber groove and a second fiber groove diverging from said first fiber groove;
    a first crimp element having an open-ended bore coaxial with said first fiber groove;
    a second crimp element having an open-ended bore coaxial with said second fiber groove;
    a first fiber stub inserted along said first fiber stub channel to enter said first crimp element;
    a second fiber stub inserted along said second fiber stub channel to enter said second crimp element;
    a molded top attached to said containment body said molded top including a substantially rectangular opening located between a first end portion and an opposing second end portion; and
    a compression element positioned in said substantially rectangular opening for movement between a first position and a second position to apply force to each of said first crimp element and said second crimp element, said compression element occupying said first position for width adjustment of each said bore, of said first crimp element and said second crimp element, to receive a stripped, cleaved and polished end portion of at least one optical fiber, said compression element occupying said second position for splicing said first fiber stub with the stripped, cleaved and polished end portion of the optical fiber in said first crimp element and splicing said second fiber stub with the stripped, cleaved and polished end portion of the optical fiber in said second crimp element;
  a biasing element having a first resilient finger parallel with a second resilient finger, said resilient fingers restricting movement of said first fiber stub and said second fiber stub after mating of said connector plug with said optical fiber receptacle;
  a bend relief boot having an opening therethrough to enclose said first end of said containment body and said first end portion of said molded top; and
  a shroud releasably engaged over said second end of said containment body and said opposing second end portion of said molded top.

2. An optical fiber connector plug for mating with an optical fiber receptacle to form an optical fiber connection, said optical fiber connector plug comprising:
  a connecting portion comprising:
    a containment body including a structured floor having a rear entry formed therein at a first end thereof and a first fiber stub exit opening to a first fiber stub channel, said first fiber stub exit being parallel to a second fiber stub exit opening to a second fiber stub channel, said first and second fiber stub exits being formed at a second end opposite said first end of said structured floor, said rear entry dividing at a junction into a first fiber groove and a second fiber groove diverging from said first fiber groove, said structured floor further including an open-ended tray, a first elongate depression and a second elongate depression, said first elongate depression located between said first fiber groove and said first fiber stub channel in coaxial alignment therewith, said second elongate depression located between said second fiber groove and said second fiber stub channel in coaxial alignment therewith, said open-ended tray communicating with and perpendicular to said first fiber stub channel and said second fiber stub channel;
    a first crimp element having a front end and a rear end and further including an open-ended bore coaxial with said first fiber groove, said first crimp element having restricted movement in said first elongate depression;
    a second crimp element having a front end and a rear end and further including an open-ended bore coaxial with said second fiber groove, said second crimp element having restricted movement in said second elongate depression;
    a first fiber stub inserted along said first fiber stub channel to enter said front end of said first crimp element when said compression element is in said first position, said first fiber stub adhesively bonded to an end of said open-ended channel;
    a second fiber stub inserted along said second fiber stub channel to enter said front end of said second crimp element when said compression element is in said first position, said second fiber stub adhesively bonded to an opposing end of said open-ended channel;
    a molded top attached to said containment body said molded top including a substantially rectangular opening located between a first end portion and an opposing second end portion, said first end portion including an injection orifice, said second end portion having a rectangular trough formed therein to surround an injection port formed through a shroud catch; and
    a compression element positioned in said substantially rectangular opening to apply force to each of said first crimp element and said second crimp element, said compression element occupying a first position to narrow each said bore of said first crimp element and said second crimp element for receiving a stripped, cleaved and polished end portion of at least one optical fiber, said compression element thereafter occupying a second position to grip the stripped, cleaved and polished end portion of the at least one optical fiber, received in each said bore, at each said rear end of each of said first crimp element and said second crimp element;
  a biasing element seated in said rectangular trough, said biasing element having a first resilient finger parallel with a second resilient finger, said resilient fingers restricting movement of said first fiber stub and said second fiber stub after mating of said optical fiber connector plug with said optical fiber receptacle;
  a bend relief boot having an opening therethrough to enclose said first end of said containment body and said first end portion of said molded top; and
  a shroud releasably engaged over said second end of said containment body and said opposing second end portion of said molded top.

3. An optical fiber connector plug for mating with an optical fiber receptacle to form an optical fiber connection, said optical fiber connector plug comprising:

a connecting portion comprising:

a containment body including a rear entry formed therein at a first end thereof and a first fiber stub exit opening to a first fiber stub channel, said first fiber stub exit being parallel to a second fiber stub exit opening to a second fiber stub channel, said first and second fiber stub exits being formed at a second end opposite said first end of said containment body, said rear entry dividing at a junction into a first fiber groove and a second fiber groove diverging from said first fiber groove;

a first crimp element having an open-ended bore coaxial with said first fiber groove;

a second crimp element having an open-ended bore coaxial with said second fiber groove;

a first fiber stub inserted along said first fiber stub channel to enter said first crimp element;

a second fiber stub inserted along said second fiber stub channel to enter said second crimp element;

a molded top attached to said containment body said molded top including an opening located between a first end portion and an opposing second end portion; and a compression element positioned in said opening for movement between a first position and a second position to apply force to each of said first crimp element and said second crimp element, said compression element occupying said first position for width adjustment of each said bore, of said first crimp element and said second crimp element, to receive a stripped, cleaved and polished end portion of at least one optical fiber, said compression element occupying said second position for splicing said first fiber stub with the stripped, cleaved and polished end portion of the optical fiber in said first crimp element and splicing said second fiber stub with the stripped, cleaved and polished end portion of the optical fiber in said second crimp element;

a biasing element having a first resilient finger parallel with a second resilient finger, said resilient fingers restricting movement of said first fiber stub and said second fiber stub after mating of said connector plug with said optical fiber receptacle;

a bend relief boot having an opening therethrough to enclose said first end of said containment body and said first end portion of said molded top; and a shroud releasably engaged over said second end of said containment body and said opposing second end portion of said molded top.

4. The optical fiber connector plug of claim 3, wherein said containment body further comprises a structured floor including an open-ended tray, a first elongate depression and a second elongate depression, said first elongate depression located between said first fiber groove and said first stub channel in coaxial alignment therewith, said second elongate depression located between said second fiber groove and said second fiber stub channel in coaxial alignment therewith, said open-ended tray communicating with said first fiber stub channel and said second fiber stub channel.

5. The optical fiber connector plug of claim 4, wherein said first crimp element and said second crimp element each have a front end and a rear end, said first crimp element having restricted movement in said first elongate depression and said second crimp element having restricted movement in said second elongate depression.

6. The optical fiber connector plug of claim 5, wherein said first stub enters said front end of said first crimp element when said compression element is in said first position, said first fiber stub having an adhesive bond to an end of said open ended channel.

7. The optical fiber connector plug of claim 6, wherein said second stub enters said front end of said second crimp element when said compression element is in said first position, said second fiber stub having an adhesive bond to an opposing end of said open ended channel.

8. The optical fiber connector of claim 3, wherein said molded top includes a substantially rectangular opening and said first end portion includes an injection orifice.

* * * * *

UNITED STATES PATENT AND TRADEMARK OFFICE
CERTIFICATE OF CORRECTION

| | | |
|---|---|---|
| PATENT NO. | : 6,848,838 B2 | Page 1 of 1 |
| APPLICATION NO. | : 10/247143 | |
| DATED | : February 1, 2005 | |
| INVENTOR(S) | : Donald G. Doss | |

It is certified that error appears in the above-identified patent and that said Letters Patent is hereby corrected as shown below:

Title Page,
Item [56] References Cited, under U.S. Patent Documents, please add the following references:

| | | |
|---|---|---|
| 5,168,145 | 12/1992 | Tackett et al |
| 5,770,001 | 6/1998 | Nagayama et al |
| 6,439,780 B1 | 8/2002 | Mudd et al |
| 2003/0156799 A1 | 8/2003 | Wada et al |
| 2003/0209330 A1 | 11/2003 | Faulkner et al |

Item [56] References Cited, under Foreign Patent Documents, please add the following reference:
WO    02/25331 A2    03/2002

Signed and Sealed this

Twenty Second Day of April, 2008

JON W. DUDAS
*Director of the United States Patent and Trademark Office*